(12) United States Patent
Williams et al.

(10) Patent No.: US 8,312,387 B2
(45) Date of Patent: Nov. 13, 2012

(54) TARGET ELEMENT ZOOM

(75) Inventors: Harel M. Williams, Seattle, WA (US); Brian E. Manthos, Sammamish, WA (US); Paul L. Cutsinger, Redmond, WA (US); Helen E. Drislane, Seattle, WA (US); Prashant Singh, Bellevue, WA (US); Louis A. Martinez, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

(21) Appl. No.: 12/538,754

(22) Filed: Aug. 10, 2009

(65) Prior Publication Data

US 2011/0035702 A1 Feb. 10, 2011

(51) Int. Cl.
*G06F 3/048* (2006.01)
(52) U.S. Cl. .................................... 715/800
(58) Field of Classification Search .............. 715/800, 715/767, 798, 801, 802
See application file for complete search history.

(56) References Cited

U.S. PATENT DOCUMENTS

| | | | | |
|---|---|---|---|---|
| 5,652,901 | A * | 7/1997 | Slayden et al. | 715/209 |
| 6,115,482 | A | 9/2000 | Sears | |
| 2006/0082901 | A1 | 4/2006 | Shoemaker | |
| 2007/0097151 | A1 | 5/2007 | Rosenberg | |
| 2007/0252821 | A1 * | 11/2007 | Hollemans et al. | 345/173 |
| 2008/0118237 | A1 * | 5/2008 | Wegenkittl et al. | 396/76 |
| 2008/0235616 | A1 * | 9/2008 | Neervoort | 715/784 |
| 2009/0021489 | A1 | 1/2009 | Westerman | |
| 2009/0109243 | A1 | 4/2009 | Kraft et al. | |
| 2009/0199130 | A1 * | 8/2009 | Tsern et al. | 715/810 |

FOREIGN PATENT DOCUMENTS

WO WO-2009049331 4/2009

OTHER PUBLICATIONS

Kobalczyk, Szymon "Resources for Multi-Touch in Windows 7", Retrieved from: http://geekswithblogs.net/kobush/archive/2009/02/13/129377.aspx on May 25, 2009., 4 Pages.
"IE8 Beta in Windows 7 Beta is Touch Enabled", Retrieved from: http://news.softpedia.com/news/IE8-Beta-in-Windows-7-Beta-Is-Touch-Enabled-101966.shtml on May 25, 2009., 2 Pages.
"Making the Web Bigger Part 1: Improvements to Zoom", Retrieved from: http://blogs.msdn.com/ie/archive/2009/05/18/making-the-web-bigger-part-1-improvements-to-zoom.aspx on May 25, 2009., 11 Pages.
Malik, Shahzad "An Exploration of Multi-Finger Interaction on Multi-Touch Surfaces", *Retrieved from: An Exploration of Multi-Finger Interaction on Multi-Touch Surfaces.*, 184 Pages.

* cited by examiner

*Primary Examiner* — Thanh Vu
(74) *Attorney, Agent, or Firm* — Wolfe-SBMC

(57) ABSTRACT

Various embodiments provide a target element zoom component that is configured to perform a focal point zoom operation on a target element using an appropriate zoom factor. In at least some embodiments, the target element zoom component receives a request to perform a zoom operation at a focal point of a target element in a page displayed in a display area. In at least some embodiments, the request is received via two-finger tap input on a screen of a touch enabled device. The target element zoom component then determines an appropriate zoom factor for the zoom operation. Responsive to determining the appropriate zoom factor, the target element zoom component performs the zoom operation on the page using the appropriate zoom factor so that the target element remains within the display area with the focal point retained.

20 Claims, 8 Drawing Sheets

TARGET ELEMENT ZOOM

BACKGROUND

Oftentimes it can be difficult for users to see and/or select an element, such as a link or a picture in a web page, displayed on a device. Users would like to be able to quickly and efficiently zoom in on an element to get a better view of the element and or select the element (e.g., select a link to another web page). Zooming in or out on an element on a page, however, may change the layout of the page. For instance, if a user zooms in on an element on a web page displayed in a web browser, the element may change its location relative to the web browser window. A picture located at the bottom left corner of the web page in a web browser window, for example, may move to the center of the web browser window as the user zooms in on the picture. Users can easily lose their place and/or become disoriented when elements change locations relative to a display area (such as a web browser window) during zoom operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a target element zoom component that is configured to perform a focal point zoom operation on a target element using an appropriate zoom factor. In at least some embodiments, the target element zoom component receives a request to perform a zoom operation at a focal point of a target element in a page displayed in a display area. In at least some embodiments, the request is received via two-finger tap input on a screen of a touch enabled device. The target element zoom component then determines an appropriate zoom factor for the zoom operation. In at least some embodiments, the appropriate zoom factor comprises a maximum zoom factor that the target element can be zoomed to and remain within the display area with the focal point retained. Responsive to determining the appropriate zoom factor, the target element zoom component performs the zoom operation on the page using the appropriate zoom factor so that the target element remains within the display area with the focal point retained. In at least some embodiments, the zoom operation comprises a layout zoom operation.

BRIEF DESCRIPTION OF THE DRAWINGS

The same numbers are used throughout the drawings to reference like features.

DETAILED DESCRIPTION

Overview

Figure 1:
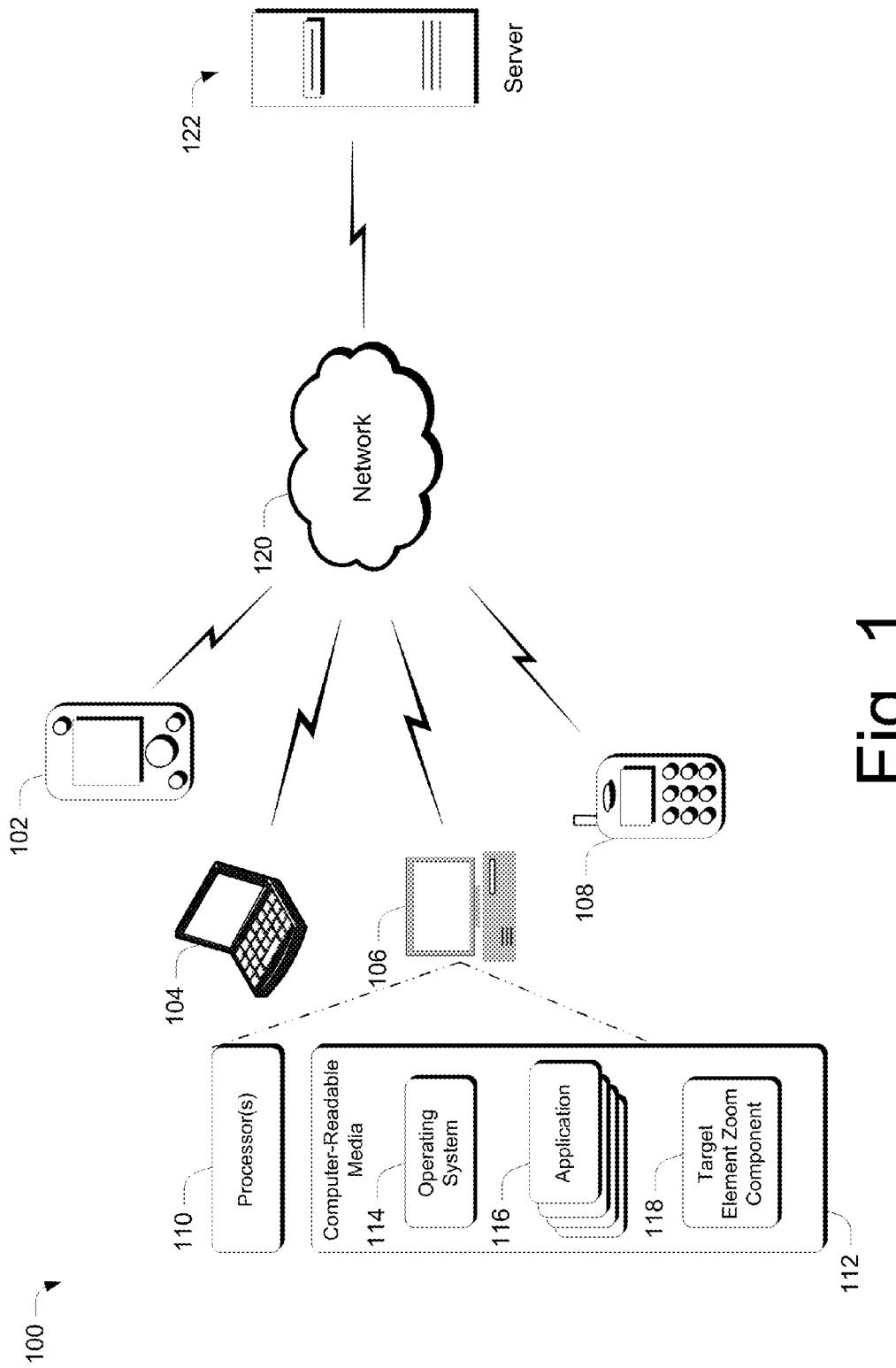
FIG. 1 illustrates an operating environment in accordance with one or more embodiments.

Various embodiments provide a target element zoom component that is configured to perform a focal point zoom operation on a target element using an appropriate zoom factor. In at least some embodiments, the target element zoom component receives a request to perform a zoom operation at a focal point of a target element in a page displayed in a display area. In at least some embodiments, the request is received via two-finger tap input on a screen of a touch enabled device. The target element zoom component then determines an appropriate zoom factor for the zoom operation. In at least some embodiments, the appropriate zoom factor comprises a maximum zoom factor that the target element can be zoomed to remain within the display area with the focal point retained. Responsive to determining the appropriate zoom factor, the target element zoom component performs the zoom operation on the page using the appropriate zoom factor so that the target element remains within the display area with the focal point retained.

In an example scenario, consider that a user would like a larger view of a web page picture displayed in a web browser of a touch enabled device. In this example the user could initiate a zoom operation on the picture by tapping two fingers on the screen of the touch enabled device where the picture is displayed. In this instance, a position of the user's fingers on the screen (where the picture is located) can define the focal point at which to perform the zoom operation. It is to be appreciated that the focal point is located at a specific location in the picture and at a specific location in the web browser window (e.g., the top right corner, the middle, or the bottom left corner of the web browser window) at the time that the user taps the screen.

Accordingly, the target element zoom component can perform the zoom operation on the web page picture so that the picture remains within the web browser window and so that the focal point remains at the same location within the picture and within the web browser window. For example, if the user taps on the center of a picture located in the bottom right corner of the web browser window, the picture will be zoomed so that the picture remains within the web browser window and so that the center of the picture will be located at the same location in the bottom right corner of the web browser window after the zoom operation is performed.

In the discussion that follows, a section entitled "Operating Environment" describes but one operating environment that can be utilized to practice the inventive principles described herein in accordance with one or more embodiments. Following this, a section entitled "Target Element Zoom Component" is provided and describes an example target element zoom component. Next, a section entitled "Example Method" describes an example method in accordance with one or more embodiments. Next, a section entitled "Implementation Example" is provided and describes an example formula that can be used to determine an appropriate zoom factor. Last, a section entitled "Example System" describes an example system that can be utilized to implement the described embodiments.

Operating Environment

FIG. 1 illustrates an operating environment in accordance with one or more embodiments, generally at 100. Operating environment 100 includes multiple different computing devices, examples of which are shown at 102, 104, 106, and 108. The computing devices can be used to process and store pieces of information. Individual computing devices can typically include one or more processors 110, one or more computer-readable media 112, an operating system 114, one or more application(s) 116 that reside on the computer-readable media and which are executable by the processor(s), and a target element zoom component 118. Target element zoom component 118 can be used to perform a focal point zoom operation on a target element using an appropriate zoom factor as described below.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 120, such as a local network or the Internet, via which information can be requested and sent. Operating environment 100 also includes, in at least some embodiments, a server 122. Server 12, like the individual computing devices, may be used to process and store pieces of information The computing devices can be embodied as any suitable computing device such as, by way of example and not limitation, a desktop computer (such as computing device 106), a portable computer (such as computing device 104), a handheld computer such as a personal digital assistant (such as computing device 102), a cell phone (such as computing device 108), and the like. In accordance with various embodiments, any of devices 102, 104, 106, and 108 may be configured as touch enabled devices.

Having discussed the general notion of an example operating environment in which various embodiments can operate, consider now a more detailed discussion of a target element zoom component in accordance with one or more embodiments.

Target Element Zoom Component

As noted above, the target element zoom component can be configured to receive a request to perform a zoom operation at a focal point of a target element in a page displayed in a display area. The target element zoom component can then determine an appropriate zoom factor for the zoom operation. In at least some embodiments, the appropriate zoom factor comprises a maximum zoom factor that the target element can be zoomed to remain within the display area with the focal point retained. Responsive to determining the appropriate zoom factor, the target element zoom component can perform the zoom operation on the page using the appropriate zoom factor so that the target element remains within the display area with the focal point retained.

A zoom operation can include zooming in (e.g. increasing the zoom percentage) and/or zooming out (e.g. decreasing the zoom percentage). In at least some embodiments, the zoom operation comprises a layout zoom operation that changes the layout of or re-lays out a page in association with each zoom operation. Re-laying out a page, therefore, may cause elements on the page to change locations relative to the display area. It is to be appreciated that a layout zoom operation is different from an optical zoom operation. Optical zoom, unlike layout zoom, linearly scales a page so that the page extends in all directions. Optical zoom, therefore, does not re-layout the page with each zoom operation.

Figure 2:
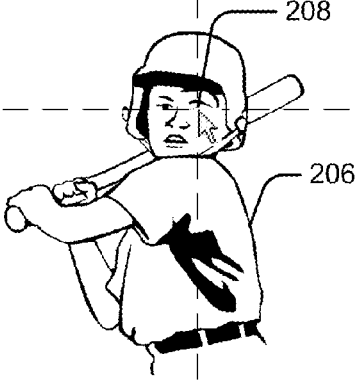
FIG. 2 illustrates an example web browser displaying a page prior to performance of a zoom operation.

To understand the concept of a focal point zoom, consider FIG. 2, which illustrates an example web browser user interface 200 prior to the performance of a zoom operation. Web browser user interface 200 includes a display area 202 in which a page 204 is displayed. In this instance, display area 202 is a web browser window of web browser 200. It is to be appreciated, however, that the term "display area" can be used to describe any area that is configured to display a page. In some cases, for example, the display area may comprise an entire physical display screen, such as the display screen of a mobile device. In other instances, however, the display area may be defined by other boundaries within a display screen area. For instance, a computer screen may be implemented to display one or more open windows (e.g. a web browser window such as display area 202 of FIG. 2). The display area, in this instance, may comprise the area defined by the boundary of the specific window being interacted with by a user.

Page 204, in this example, is a web page displaying a game summary of a baseball game. However, as described throughout, a "page" can include any page of content such as a web page, a digital picture, or a user interface. Page 204 includes a target element 206, which in this instance is a web page picture of a baseball player. As described throughout, however, the term "target element" can be used to describe any type of element in a page, such as a picture or a text box in a web page.

In FIG. 2, a user has positioned a mouse cursor at focal point 208 of target element 206, which is located at the intersection of the dashed lines in FIG. 2. The dashed lines in FIG. 2 are used to show the location of focal point 208 relative to display area 202. As described throughout, the term "focal point" is used to describe the location in a page (e.g. a web page, a picture, an email message) at which a request to perform a zoom operation is received. In this example, consider that the user can zoom in or out on focal point 208 by simply clicking a button on the mouse. The location of the mouse cursor, in this case, can define the focal point (e.g. focal point 208 of FIG. 2).

Figure 3:
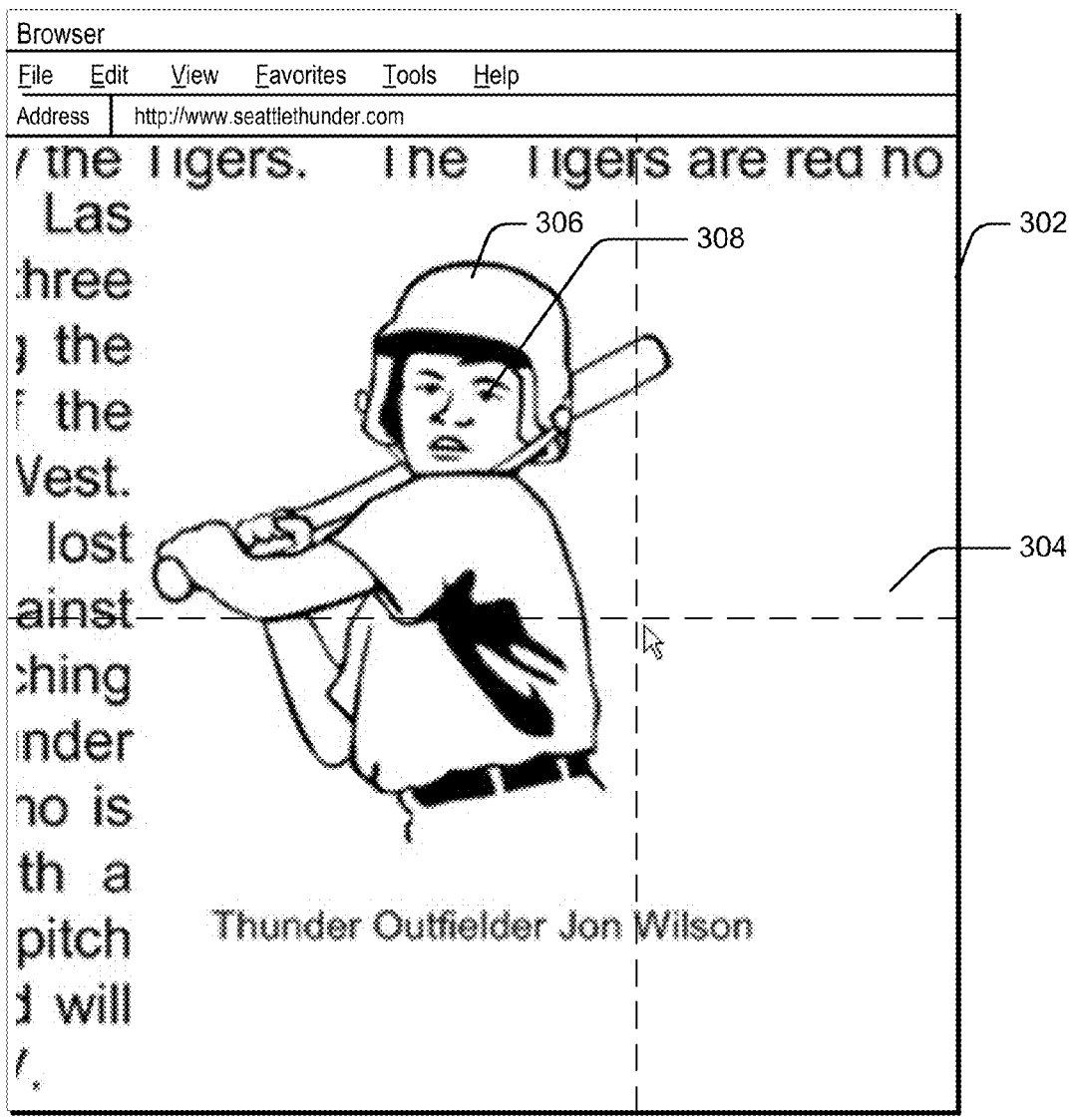
FIG. 3 illustrates an example web browser displaying a page after performance of the zoom operation in accordance with prior solutions.

In the past, performing a zoom operation on a target element would change the layout of the page. Consider, for example, FIG. 3 which illustrates an example web browser user interface 300, in accordance with previous solutions, after a user has initiated a zoom operation by clicking a mouse button at focal point 208 in FIG. 2. Notice that the size of page 304 and target element 306 has increased in response to the zoom operation. Notice also that the location of page 304 and target element 306 has changed relative to display area 302 so that target element 306 is now located at the center of the display area and that focal point 308 is no longer positioned at the same location relative to display area 302. More specifically, in FIG. 3, focal point 308 is no longer positioned at the location of the mouse cursor at the intersection of the dashed lines as it was in FIG. 2 before the zoom operation was performed.

Performing a layout zoom operation that changes the layout of a page so that the focal point is no longer located at the same location relative to a display area may cause a user to become disoriented. For instance, if the user desires to zoom further in on target element 306 in FIG. 3, the mouse cursor must be repositioned over focal point 308 from its current location at the intersection of the dashed lines.

Figure 4:
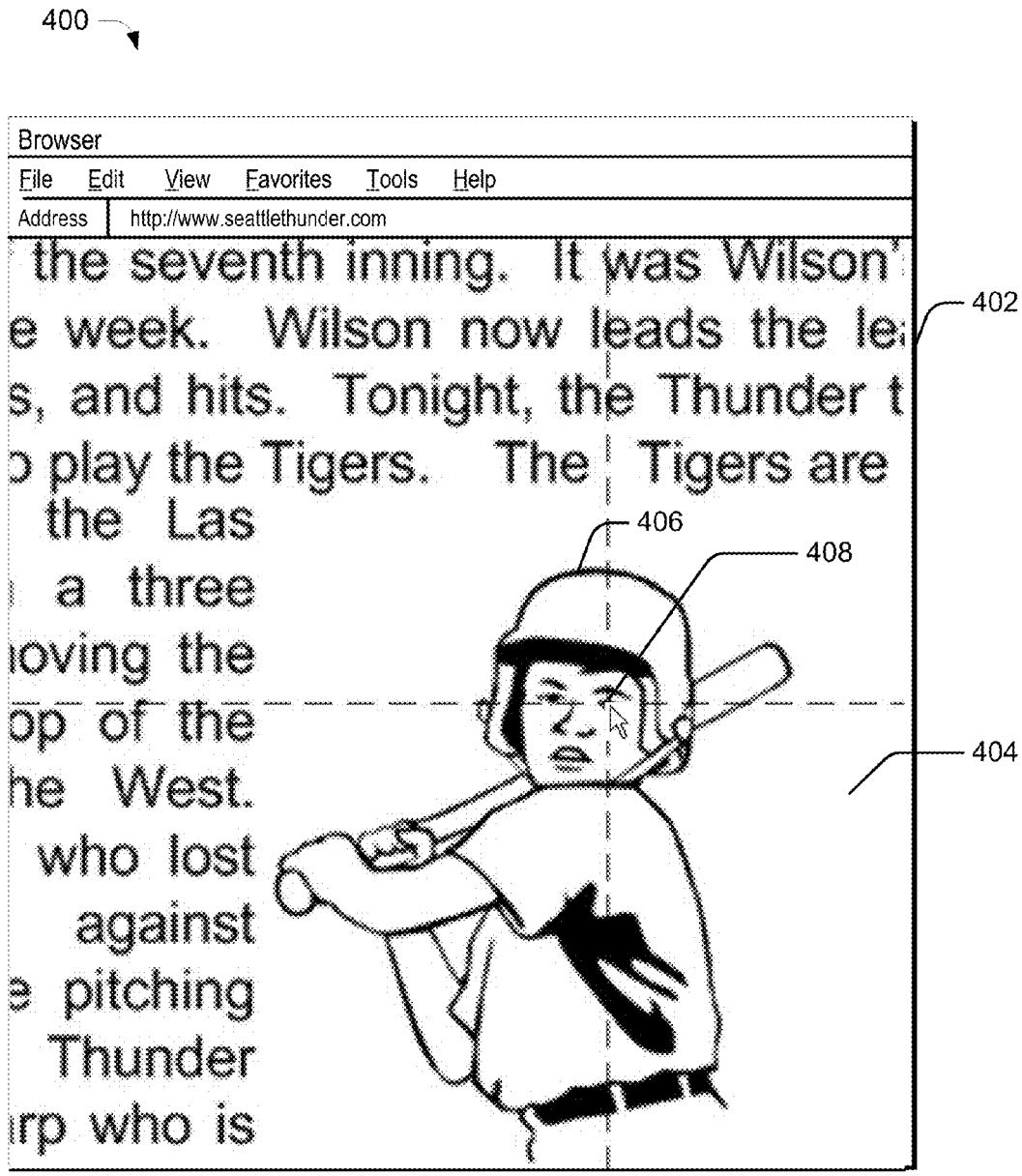
FIG. 4 illustrates an example web browser displaying a page after performance of the zoom operation in accordance with one or more embodiments.

Therefore, in accordance with various embodiments, the target element zoom component is configured to perform the zoom operation so that the focal point is retained. As described throughout, the focal point is retained if a location of the focal point relative to the target element and relative to the display area is retained. Consider, for example, FIG. 4 which illustrates an example web browser user interface 400, in accordance with various embodiments, after a user has initiated a zoom operation at focal point 208 in FIG. 2. Notice that similar to FIG. 3, the size of page 404 and target element 406 has increased in response to the zoom operation. In FIG. 4, however, the location of focal point 408 relative to target element 406 and relative to display area 402 has been retained. More specifically, focal point 408 is still located over the eye of the baseball player and at the location of the mouse cursor.

In at least some embodiments, after performing a layout zoom operation on a page, the target element zoom component can re-position the page to place the focal point of the page at a same location relative to the display area that the focal point was located prior to performing the zoom operation. For example, as discussed in more detail in co-pending patent application entitled "Focal Point Zoom" (Ser. No. 12/538,756; Inventors: Harel Williams, Brian Manthos, Fergal Burke, Prashant Singh), incorporated by reference herein, the target element zoom component can be configured to scroll the page to place the focal point of the page at the same location relative to the display area that the focal point was located prior to performing the zoom operation. It is to be appreciated that a user may not notice the repositioning of the page. Instead, it may appear to the user as if the page is being zoomed in at the focal point.

In accordance with various embodiments, the target element zoom component is configured to perform the focal point zoom operation at an appropriate zoom factor. In at least some embodiments, the appropriate zoom factor comprises a maximum zoom factor that the target element can be zoomed to remain entirely within the display area with the focal point retained. In FIG. 4, an appropriate zoom factor has been used to zoom target element 406. Notice, that in addition to retaining focal point 408 (as discussed above) that target element 406 is still completely within display area 402. Additionally, target element 406 has been zoomed at the maximum zoom factor so that the target element remains within the display area with the focal point retained. Notice, for example, that if target element 406 were to be zoomed in any further, that the bottom of target element 406 would be located outside of display area 402. It is to be appreciated, that zooming in on a target element as much as possible while retaining the focal point of the target element and keeping the target element within the display area provides the user with a more consistent and intuitive zooming experience.

In various embodiments, a request to perform a zoom operation can be received via a "touch" or "tap" gesture on a touch enabled device. A variety of different touch or tap gestures can be used. In accordance with at least some embodiments, a request to perform a zoom operation on a target element can be received via "two-finger tap" input on a screen of a touch enabled device. As described throughout, two-finger tap input can be received via a user positioning and/or tapping two fingers onto a screen of the touch enabled device. In accordance with various embodiments, a midpoint between positions of two fingers on the screen, from the two-finger tap input, can define the focal point.

Figure 5:
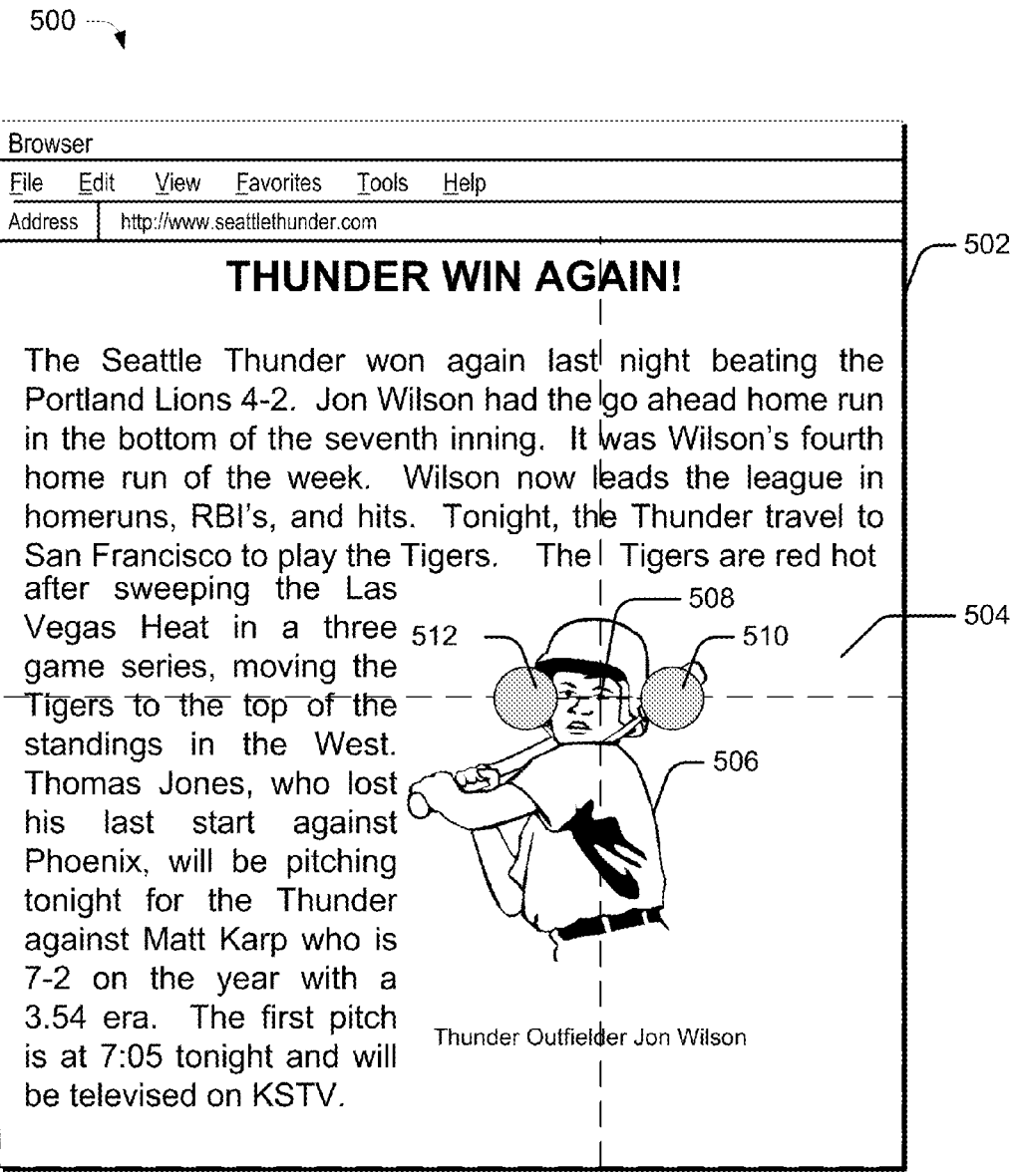
FIG. 5 illustrates an example web browser displaying a page prior to performance of a zoom operation initiated via a two-finger tap input on a screen of a touch enabled device in accordance with one or more embodiments.

Consider, for example, FIG. 5, which illustrates an example web browser user interface 500 prior to the performance of a zoom operation initiated via a two-finger tap input on a screen of a touch enabled device. Like FIGS. 2-4, web browser user interface 500 includes a display area 502 in which a page 504 is displayed, a target element 506, and a focal point 508. Web browser user interface 500 also includes two-finger tap input 510 and 512 which can be received via a user positioning and/or tapping two fingers onto a screen of the touch enabled device. Notice that focal point 508 is located at the midpoint between two-finger tap input 510 and 512.

It is to be appreciated that using the midpoint of the position of the user's fingers on the screen as the focal point may allow the user to two-finger tap in the general location of the target element without having to precisely hit the element with either finger. In other words, as long as the midpoint between the position of the user's fingers on the screen is within the boundaries of the target element, the element will be selected. Therefore, a user can quickly and easily select a target element to zoom in on by tapping in the general location of the element with two fingers.

After receiving the two-finger tap input, the target element zoom component can be configured to select a target element that is located at the midpoint between positions of two fingers on the screen from the two-finger tap input. The target element zoom component can then perform the zoom operation on the selected target element at an appropriate zoom factor so that the target element remains within the display area and so that a location of the focal point (as determined by the midpoint between positions of two fingers on the screen) relative to the element and to the display area is retained.

In accordance with various embodiments, the appropriate zoom factor can comprise a relative zoom factor that can be applied to a current default zoom level of a page. A default zoom level of a page comprises the original zoom level of the page prior to the performance of a zoom operation. For example, if a web page has a default zoom level of 125% then a zoom factor of 3.0, when applied to the default zoom level would change the zoom level to 475% (125%*3.0).

In at least some embodiments, if an additional zoom operation request is received, the target element zoom component can perform an additional zoom operation on the page so that the page is displayed at a default zoom level. For example, if an additional two-finger tap input is received, the target element zoom component can zoom the page back out so that the page is displayed at the default zoom level. Alternately, in at least some embodiments, if an additional two-finger tap input is received, the target element zoom component can be configured to perform an additional zoom operation at an appropriate zoom factor. While specific examples of requests to perform zoom operations have been discussed above, it is to be appreciated that there are a variety of different ways in which zoom operations can be requested using a variety of different mouse, touch, keyboard, and/or user interface selections and movements.

Having considered an example target element zoom component, consider now an example method that the target element zoom component can implement to perform a zoom operation on a page using an appropriate zoom factor so that a target element remains within a display area with a focal point retained, in accordance with one or more embodiments.

Example Method

Figure 6:
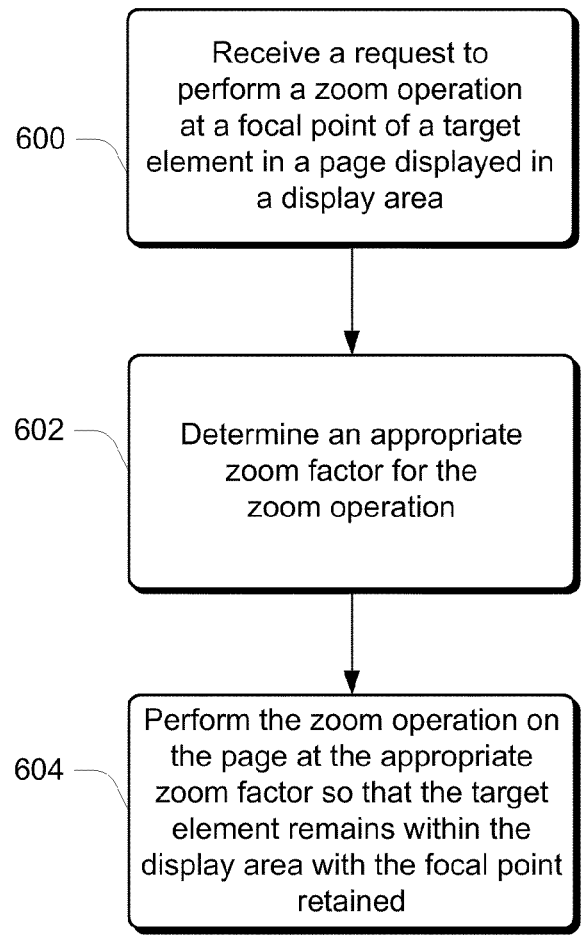
FIG. 6 is a flow diagram that describes steps in a method in accordance with one or more embodiments.

FIG. 6 is a flow diagram that describes steps in a method in accordance with one or more embodiments. The method can be implemented in connection with any suitable hardware, software, firmware, or combination thereof. In at least some embodiments, aspects of the method can be performed by a target element zoom component, such as target element zoom component 118, executing on a computing device or on a server, such as the computing devices and server illustrated in FIG. 1.

Step 600 receives a request to perform a zoom operation at a focal point of a target element in a page displayed in a display area. For example, in the FIG. 2 illustration, target element zoom component 118 may be configured to receive a zoom request at focal point 208 of target element 206 of page 204 displayed in display area 202. In at least some embodiments, a request to perform a zoom operation on a target element can be received via two-finger tap input on a screen of a touch enabled device. As described throughout, two-finger tap input can be received via a user positioning and/or tapping two fingers onto a screen of the touch enabled device. In accordance with various embodiments, a midpoint between positions of two fingers on the screen, from the two-finger tap input, can define the focal point. It is to be appreciated, however, that there are a variety of different ways in which zoom operations can be requested using a variety of different mouse, touch, keyboard, and/or user interface movements and selections.

Step 602 determines an appropriate zoom factor for the zoom operation. In at least some embodiments, the appropriate zoom factor comprises a maximum zoom factor that the target element can be zoomed to remain within the display area with the focal point retained. For example, in FIG. 4, target element 406 is still completely within display area 402 and a location of focal point 408 relative to target element 406 and relative to display area 402 is retained.

To determine the appropriate zoom factor, target element zoom component 118 can use information corresponding to a location of the focal point relative to the target element and information corresponding to a location of the target element relative to the display area. In at least some embodiments, the target element zoom component can determine a maximum zoom factor that the target element can be zoomed to remain within the display area with the focal point retained for the left, right, top, and bottom edges of the display area using the information corresponding to a location of the focal point relative to the target element and the information corresponding to a location of the target element relative to the display area. The target element zoom component can then select a minimum of the maximum zoom factors for the left, right, top, and bottom edges of the display area as the appropriate zoom factor. Selecting the minimum of these maximum zoom factors as the appropriate zoom factor ensures that the target element will stay within the display area on each edge of the display area when the zoom operation is performed.

In some instances, zooming a target element at the appropriate zoom factor may result in a bad user experience. For example, too small of a zoom factor may not meaningfully increase the size of the target element. This could occur, for example, if a target element is located near an edge of the display area. In this case, the zoom factor would be small because the target element could not be zoomed very much before part of the target element would be outside of the display area at the edge of the display area. Similarly, too large of a zoom factor may zoom a target element too much causing the target element to become blurry or take up too much of the display area. For example, if the target element is very small it may appear blurry if it is zoomed at a very high zoom factor. Additionally, if a display area is very large it may be undesirable for the target element to be zoomed so that it occupies a large portion of the display area.

Therefore, in at least some embodiments, and after calculating the appropriate zoom factor, the target element zoom component can compare the appropriate zoom factor to a minimum threshold zoom factor and a maximum threshold zoom factor to determine whether the appropriate zoom factor is too small or too large. If the target element zoom component determines that the appropriate zoom factor is less than a minimum threshold zoom factor then the target element zoom component can use the minimum threshold zoom factor to perform the zoom operation. Similarly, if the target element zoom component determines that the appropriate zoom factor is greater than a maximum threshold zoom factor then the target element zoom component can use the maximum threshold zoom factor to perform the zoom operation. In at least one embodiment, the minimum threshold zoom factor is 1.5 and the maximum threshold zoom factor is 3.0.

Step 604 performs the zoom operation on the page using the appropriate zoom factor so that the target element remains within the display area with the focal point retained. For example, target element zoom component 118 has performed a zoom operation on page 404 using the appropriate zoom factor so that target element 406 is still completely within display area 402 and a location of focal point 408 relative to target element 406 and relative to display area 402 is retained. Alternately, target element zoom component 118 can perform the zoom operation on the page using the minimum threshold zoom factor responsive to determining that the appropriate zoom factor is less than the minimum threshold zoom factor. Alternately, target element zoom component 118 can perform the zoom operation on the page using the maximum threshold zoom factor responsive to determining that the appropriate zoom factor is greater than the maximum threshold zoom factor.

In at least some embodiments, if an additional zoom operation request is received, the target element zoom component can perform an additional zoom operation on the page so that the page is displayed at a default zoom level. For example, if an additional two-finger tap input is received, the target element zoom component can zoom the page back out so that the page is displayed at the default zoom level. The two-finger tap input, therefore, can be used to toggle back and forth between an appropriate zoom level and a default zoom level. It is to be appreciated that an additional two-finger input can be received anywhere on the screen of the touch enabled device to cause the target element zoom component to zoom the page back to the default zoom level. In other words, a user does not need to two-finger tap at the focal point in order to zoom the page back out to the default zoom level. A user, therefore, can quickly and easily zoom in and zoom back out on elements of interest.

Having discussed an example method of a target element zoom component, consider now an implementation example.

Implementation Example

Figure 7:
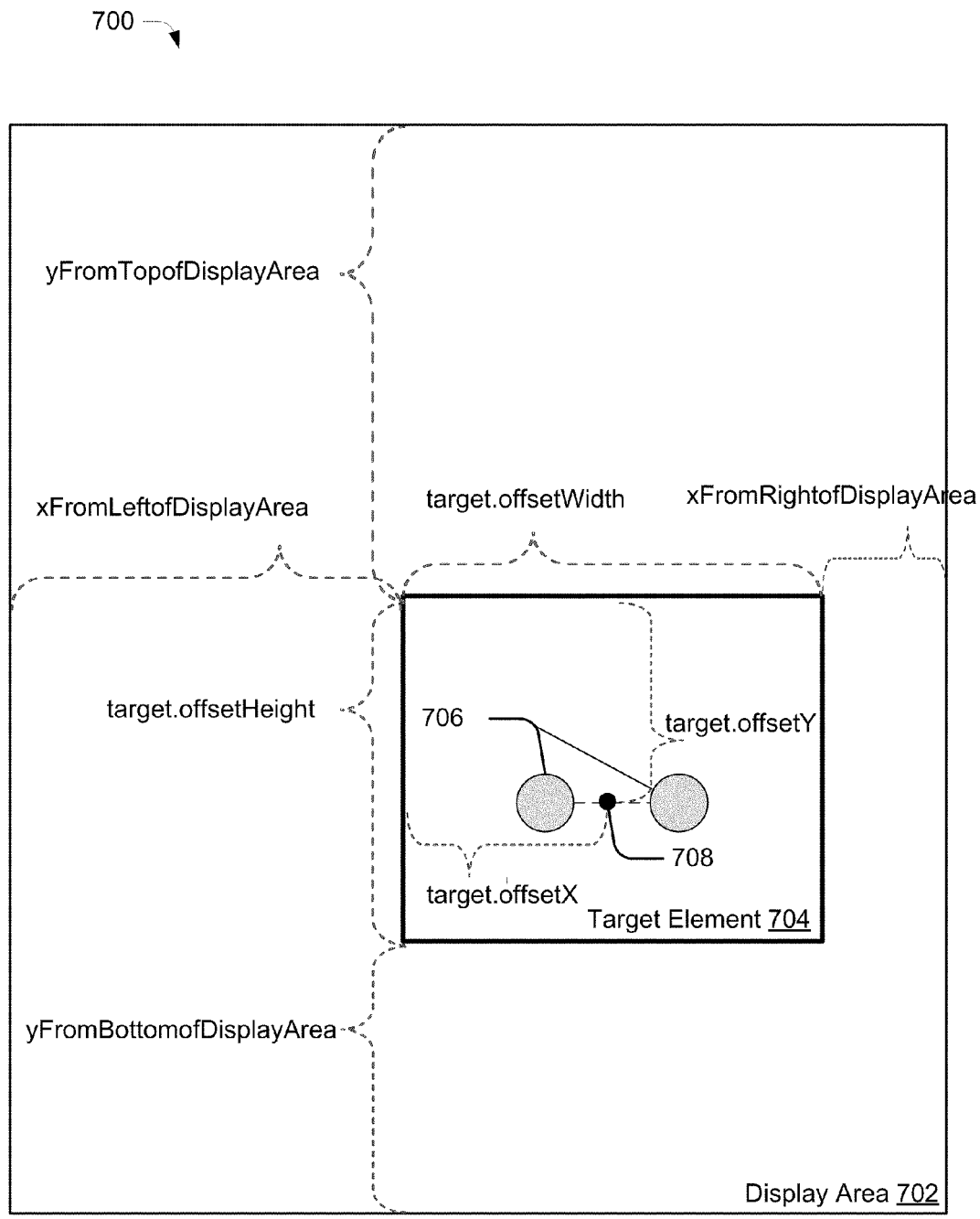
FIG. 7 illustrates an implementation example in accordance with one or more embodiments.

FIG. 7 illustrates an implementation example 700 in accordance with various embodiments. Example 700 includes a display area 702 (e.g. a web browser window such as display area 202), a target element 704 of a page (e.g. a picture in a web page such as target element 206), two-finger tap input 706, and a focal point 708. FIG. 7 also illustrates information corresponding to a location of focal point 708 relative to target element 704 and information corresponding to a location of target element 704 relative to display area 702 that can be used to determine an appropriate zoom factor, including: target.offsetWidth, target.offsetHeight, target.offsetX, target.offsetY, xfromLeftofDisplayArea, xFromRightofDisplayArea, yFromTopofDisplayArea, and yFromBottomofDisplayArea.

Target.offsetWidth and target.offsetHeight comprise the respective width and height (e.g. in pixels) of target element 704. Target.offsetX comprises the horizontal distance from the left border of target element 704 to focal point 708. Similarly, target.offsetY comprises the vertical distance from the top border of target element 704 to focal point 708. XfromLeftofDisplayArea and xFromRightofDisplayArea comprise the respective horizontal distances from the left border of display area 702 to the left border of target element 704 and from the right border of display area 702 to the right border of target element 704. YFromTopofDisplayArea and YFromBottomofDisplayArea comprise the respective vertical distances from the top border of display area 702 to the top border of target element 704 and from the bottom border of display area 702 to the bottom border of target element 704.

In at least some embodiments, the target element zoom component is configured to determine an appropriate zoom factor by calculating a maximum zoom factor that can be applied to the target element so the target element remains entirely within the display area with the focal point retained. In at least some embodiments, the target element zoom component can calculate a maximum zoom factor that will keep the target element within the display area and retain the focal point for the left, right, top, and bottom edges of the display area. The target element zoom component can then select the minimum of these maximum zoom factors as the appropriate zoom factor. Selecting the minimum of the maximum zoom factors as the appropriate zoom factor ensures that the target element will remain within each edge of the display area when the zoom operation is performed.

To determine the appropriate zoom factor, the target element zoom component can use the information corresponding to a location of the focal point relative to the target element and the information corresponding to a location of the target element relative to the display area (e.g., target.offsetWidth, target.offsetHeight, target.offsetX, target.offsetY, xfromLeftofDisplayArea, xFromRightofDisplayArea, yFromTopofDisplayArea, and/or yFromBottomofDisplayArea). In at least some embodiments, the following formulas can be used to calculate the maximum zoom factors for the left, right, top, and bottom edges of display area 702 that can be applied to the target element so that the target element remains within the display area with the focal point retained:

$$ZoomFactor_{Left} = \frac{target.offsetX + xFromLeftofDisplayArea}{target.offsetX}$$

$$ZoomFactor_{Right} = \frac{target.offsetWidth - target.offsetX + xFromRightofDisplayArea}{target.offsetWidth - target.offsetX}$$

$$ZoomFactor_{Top} = \frac{target.offsetY + yFromTopofDisplayArea}{target.offsetY}$$

$$ZoomFactor_{Bottom} = \frac{target.offsetHeight - target.offsetY + yFromBottomofDisplayArea}{target.offsetHeight - target.offsetY}$$

In the formulas above, each zoom factor comprises a ratio of a distance from an edge of the display area (e.g. the left edge of the display area) to the focal point divided by a distance from the from the edge of the target element (e.g. the left edge of the target element) to the focal point. Accordingly, $ZoomFactor_{Left}$ and $ZoomFactor_{Right}$ comprise the maximum zoom factor at which the target element can be zoomed and remain within the display area to the left and to the right, respectively. Similarly, $ZoomFactor_{Top}$ and $ZoomFactor_{Bottom}$ comprise the maximum zoom factor at which the target element can be zoomed and remain within the display area to the top and to the bottom, respectively. The minimum of the zoom factors, therefore, is the maximum zoom factor that can be applied to the target element so that the target element remains in the display area. For example, if the minimum zoom factor is $ZoomFactor_{Left}$ which has a zoom factor of 1.5, then applying a higher zoom factor (e.g. 2.0) would cause the target element to extend outside of the display area on the left side of the display area. In order to bring the left side of the target element back into the display area, the target element would have to be shifted to the right which would cause the focal point relative to the display area to change.

Therefore, in accordance with at least some embodiments, the appropriate zoom factor comprises the minimum zoom factor of the maximum zoom factors for the left, right, top, and bottom edges of the display area, and can be calculated using the following formula:

$$AppropriateZoomFactor = min(ZoomFactor_{Left}, ZoomFactor_{Right}, ZoomFactor_{Top}, ZoomFactor_{Bottom})$$

Alternately, a $ZoomFactor_X$ and a $ZoomFactor_Y$ can be calculated as $min(ZoomFactor_{Left}, ZoomFactor_{Right})$ and $min(ZoomFactor_{Top}, ZoomFactor_{Bottom})$, respectively. In this case, $ZoomFactor_X$ and a $ZoomFactor_Y$ comprise the minimum zoom factor in the x and y direction, respectively. The appropriate zoom factor can then be calculated as $min(ZoomFactor_X, ZoomFactor_Y)$.

In at least some embodiments, and after calculating the appropriate zoom factor, the target element zoom component can compare the appropriate zoom factor to a minimum threshold zoom factor and a maximum threshold zoom factor to determine whether the appropriate zoom factor is too small (e.g., the zoom factor may not meaningfully increase the size of the target element) or too large (e.g. the zoom factor may zoom a target element too much causing the element to become blurry or to take up too much of the display area). If the target element zoom component determines that the appropriate zoom factor is less than the minimum threshold zoom factor then the target element zoom component can use the minimum threshold zoom factor to perform the zoom operation. Similarly, if the target element zoom component determines that the appropriate zoom factor is greater than the maximum threshold zoom factor then the target element zoom component can use the maximum threshold zoom factor to perform the zoom operation. In at least one embodiment, the minimum threshold zoom factor is 1.5 and the maximum threshold zoom factor is 3.0.

If a minimum or maximum threshold zoom factor is used, the target element zoom component may be unable to retain the focal point while keeping the target element within the display area. For instance, if the appropriate zoom factor is calculated to be less than the minimum threshold zoom factor, then zooming the target element using the minimum threshold zoom factor may cause part of the target element to be zoomed out of the display area. In at least some embodiments, therefore, the target element zoom component can determine that at least a part of the target element will be located outside of the display area after the zoom operation is performed. Accordingly, the target element zoom component can reposition the target element, after performing the zoom operation, to place the element back within the display area. Repositioning the target element may not be noticeable to a user. It is to be appreciated that repositioning the target element may cause a change in the location of the focal point relative to the display area. Therefore, the target element zoom component can be configured to scroll the target element a minimum distance to place the target element back within the display area. Scrolling the target element a minimum distance ensures that the focal point location will move a minimal amount.

The target element zoom component can use the following formulas to scroll a target element back into the display area:

$$scrollLeft_{New} = DisplayArea_{Width} - (targetClientRect.right - scrollLeft_{Old})$$

$$scrollTop_{New} = DisplayArea_{Height} - (targetClientRect.top - scrollTop_{Old})$$

In the formulas above, $DisplayArea_{Width}$ and $DisplayArea_{Height}$ are the width and height, respectively, of the display area. $ScrollLeft_{Old}$ and $scrollTop_{Old}$ are the scroll distances, to the left and top respectively, after the performance of the zoom operation that places the target element outside of the display area. TargetClientRect.right and targetClientRect.top are the right and top coordinates of the target element after the performance of the zoom operation that places the target element outside of the display area. Accordingly, $scrollLeft_{New}$ and $scrollTop_{New}$ are the scroll distances, to the left and top respectively, that can be used to scroll the target element to place the target element back within the display area after a zoom operation is performed. Therefore, if a zoom operation places a target element outside of the display area, the target element zoom component can reposition the target element using $scrollLeft_{New}$ and $scrollLeft_{Top}$ to place the target element back within the display area. Alternately, in at least some embodiments, the target element zoom component can be configured to retain the focal point of the target element even when part of the element is zoomed out of the display area.

In at least some embodiments, the target element zoom component can determine an appropriate zoom factor by determining whether a size of the target element (e.g. the width and/or the height of the target element) is greater than a threshold size. If the size of the target element is not greater the threshold size, then the target element zoom component can determine whether a size of a parent element is within a threshold range (e.g., a range of 200 pixels to 400 pixels). If the parent element is within the threshold range, then a size of the parent element (e.g. offsetWidth and offsetHeight of the parent element) can be used to determine the appropriate zoom factor. If the parent element is not within the threshold range, then the target element zoom component can use an artificial offsetWidth and/or and offsetWidth for the target element. In at least some embodiments, the artificial offsetWidth and offsetHeight comprises 200 pixels.

Example System

Figure 8:
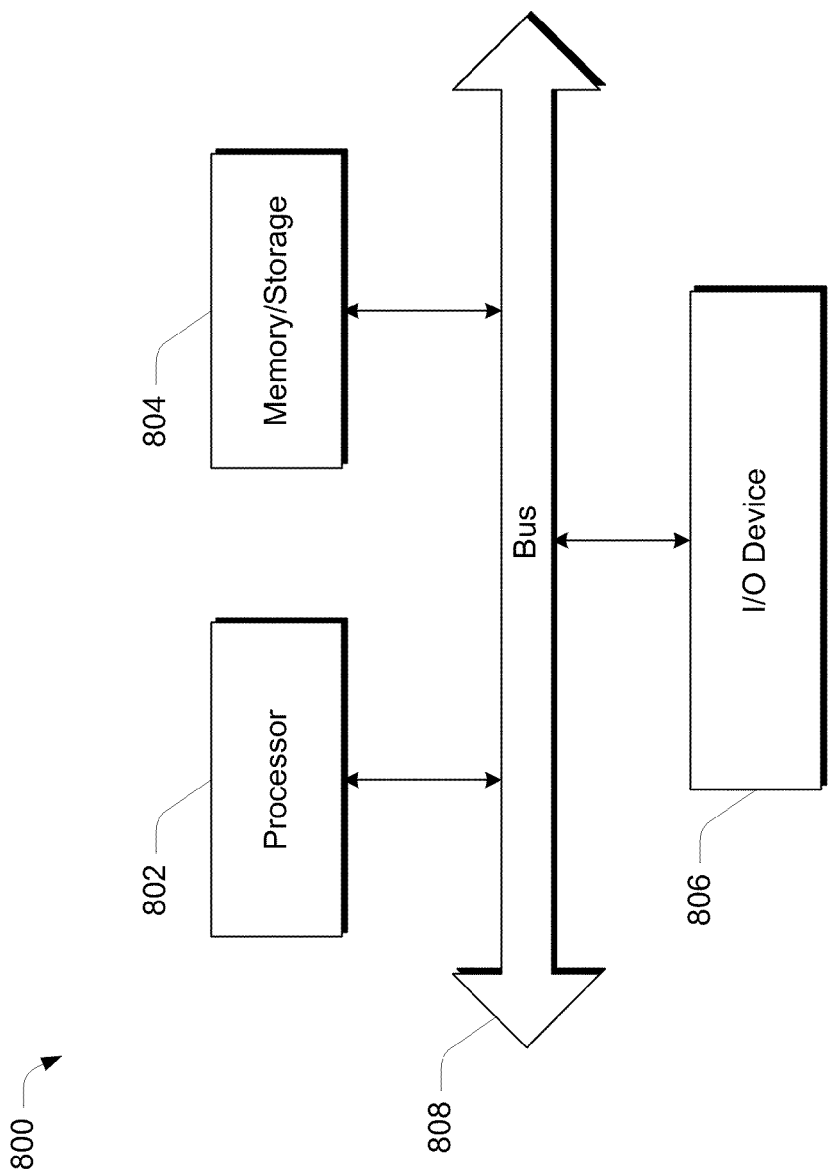
FIG. 8 is a block diagram of an example system that can be utilized to implement one or more embodiments.

FIG. 8 illustrates an example computing device 800 that can implement the various embodiments described above. Computing device 800 can be, for example, various computing devices or servers, such as those illustrated in FIG. 1 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide a target element zoom component that is configured to perform a focal point zoom operation on a target element using an appropriate zoom factor. In at least some embodiments, the target element zoom component receives a request to perform a zoom operation at a focal point of a target element in a page displayed in a display area. In at least some embodiments, the request is received via two-finger tap input on a screen of a touch enabled device. The target element zoom component then determines an appropriate zoom factor for the zoom operation. In at least some embodiments, the appropriate zoom factor comprises a maximum zoom factor that the target element can be zoomed to remain within the display area with the focal point retained. Responsive to determining the appropriate zoom factor, the target element zoom component performs the zoom operation on the page using the appropriate zoom factor so that the target element remains within the display area with the focal point retained. In at least some embodiments, the zoom operation comprises a layout zoom operation.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter

What is claimed is:

1. A computer-implemented method comprising:
   receiving a request to perform a zoom operation at a focal point of a target element in a page displayed in a display area, wherein the target element comprises a portion of the page;
   determining an appropriate zoom factor for the zoom operation based on a height and a width of the target element in the page; and
   performing the zoom operation on the page using the appropriate zoom factor so that the target element remains within the display area with the focal point of the target element retained relative to the target element and relative to the display area.

2. The computer-implemented method as recited in claim 1, wherein the request is received via two-finger tap input on a screen of a touch enabled device, and wherein the focal point comprises a midpoint between positions of two fingers on the screen.

3. The computer-implemented method as recited in claim 2, further comprising:
   receiving an additional two-finger tap input on the screen of the touch enabled device; and
   performing an additional zoom operation on the page responsive to receiving the additional two-finger tap input.

4. The computer-implemented method as recited in claim 1, wherein the zoom operation comprises a layout zoom operation.

5. The computer-implemented method as recited in claim 1, wherein the appropriate zoom factor is determined using information corresponding to a location of the focal point relative to the target element and information corresponding to a location of the target element relative to the display area.

6. The computer-implemented method as recited in claim 1, wherein the appropriate zoom factor comprises a maximum zoom factor that the target element can be zoomed to remain entirely within the display area with the focal point retained.

7. The computer-implemented method as recited in claim 1, wherein determining the appropriate zoom factor further comprises:
   determining a maximum zoom factor that the target element can be zoomed to remain within the display area with the focal point retained for left, right, top, and bottom edges of the display area; and
   selecting a minimum of the maximum zoom factors for the left, right, top and bottom edges of the display area as the appropriate zoom factor.

8. The computer-implemented method as recited in claim 1, further comprising:
   comparing the appropriate zoom factor to a minimum threshold zoom factor and a maximum threshold zoom factor responsive to determining the appropriate zoom factor; and
   performing the zoom operation on the page using the minimum threshold zoom factor responsive to determining that the appropriate zoom factor is less than the minimum threshold zoom factor; or
   performing the zoom operation on the page using the maximum threshold zoom factor responsive to determining that the appropriate zoom factor is greater than the maximum threshold zoom factor.

9. The computer-implemented method as recited in claim 8, further comprising:
   determining that at least a part of the target element will be located outside of the display area after the zoom operation is performed; and
   repositioning the target element, after performing the zoom operation, to place the target element entirely within the display area.

10. One or more computer-readable storage media embodying computer executable instructions, which when executed by one or more processors perform a method, comprising:
    receiving a request to perform a zoom operation at a focal point of a target element in a page displayed in a display area, wherein the request is received via two-finger tap input on a screen of a touch enabled device and the target element comprises a portion of the page;
    determining an appropriate zoom factor for the zoom operation based on a distance from an edge of the display area to an edge of the target element; and
    performing the zoom operation on the page using the appropriate zoom factor so that the target element remains within the display area with the focal point of the target element retained relative to the target element and relative to the display area.

11. One or more computer-readable storage media as recited in claim 10, further comprising:
    receiving an additional two-finger tap input on the screen of the touch enabled device; and
    performing an additional zoom operation on the page responsive to receiving the additional two-finger tap input.

12. One or more computer-readable storage media as recited in claim 10, wherein the zoom operation comprises a layout zoom operation.

13. One or more computer-readable storage media as recited in claim 10, wherein the appropriate zoom factor is determined using information corresponding to a location of the focal point relative to the target element and information corresponding to a location of the target element relative to the display area.

14. One or more computer-readable storage media as recited in claim 10, wherein the appropriate zoom factor comprises a maximum zoom factor that the target element can be zoomed to remain entirely within the display area with the focal point retained.

15. One or more computer-readable storage media as recited in claim 10, wherein determining the appropriate zoom factor further comprises:
    determining a maximum zoom factor that the target element can be zoomed to remain within the display area with the focal point retained for left, right, top, and bottom edges of the target element; and
    selecting a minimum of the maximum zoom factors for the left, right, top and bottom edges of the display area as the appropriate zoom factor.

16. One or more computer-readable storage media as recited in claim 10, further comprising:
    comparing the appropriate zoom factor to a minimum threshold zoom factor and a maximum threshold zoom factor responsive to determining the appropriate zoom factor; and performing the zoom operation on the page using the minimum threshold zoom factor responsive to determining that the appropriate zoom factor is less than the minimum threshold zoom factor; or performing the zoom operation on the page using the maximum threshold zoom factor responsive to determining that the appropriate zoom factor is greater than the maximum threshold zoom factor.

17. One or more computer-readable storage media as recited in claim 16, further comprising:

determining that at least a part of the target element will be located outside of the display area after the zoom operation is performed; and repositioning the target element, after performing the zoom operation, to place the target element back within the display area.

18. A computer-implemented method comprising:

receiving a request to perform a layout zoom operation via two-finger tap input on a screen of a touch enabled device;

selecting a target element that is located at a midpoint between positions of two fingers on the screen from the two-finger tap input and that comprises a portion of a page displayed via the screen of the touch enabled device;

determining a zoom factor for the layout zoom operation based, at least in part, on a height and a width of the target element; and performing the layout zoom operation on the page containing the target element using the zoom factor so that the target element remains within the display area with a focal point of the target element appearing to be retained relative to the target element and relative to the display area.

19. The computer-implemented method as recited in claim 18, further comprising:

receiving an additional two-finger tap input on the screen of the touch enabled device; and performing an additional layout zoom operation so that the target element is displayed at a default zoom level.

20. The computer-implemented method as recited in claim 18, further comprising:

determining that at least part of the target element will be located outside of the display area after the zoom operation is performed; and repositioning the target element, after performing the zoom operation, to place the target element entirely within the display area.

* * * * *